US012778148B2

(12) United States Patent
Orlovic et al.

(10) Patent No.: US 12,778,148 B2
(45) Date of Patent: Nov. 3, 2026

(54) POWDER COMPRISING LACTATE-COATED PARTICLES AND METHOD FOR THE PREPARATION THEREOF

(71) Applicant: Purac Biochem B.V., Gorinchem (NL)

(72) Inventors: Marija Orlovic, Gorinchem (NL); Lambertus Henricus Elisabeth Roozen, Gorinchem (NL)

(73) Assignee: PURAC BIOCHEM B.V., Gorinchem (NL)

( * ) Notice: Subject to any disclaimer, the term of this patent is extended or adjusted under 35 U.S.C. 154(b) by 888 days.

(21) Appl. No.: 17/852,112

(22) Filed: Jun. 28, 2022

(65) Prior Publication Data

US 2022/0322710 A1 Oct. 13, 2022

Related U.S. Application Data

(63) Continuation of application No. PCT/EP2020/087997, filed on Dec. 29, 2020.

(30) Foreign Application Priority Data

Jan. 3, 2020 (EP) .................................... 20150170

(51) Int. Cl.

| | |
|---|---|
| ***A23B 2/754*** | (2025.01) |
| ***A23B 4/20*** | (2006.01) |
| ***A23B 70/10*** | (2025.01) |
| ***A23L 13/40*** | (2023.01) |
| ***A23P 20/18*** | (2016.01) |

(52) U.S. Cl.

CPC ................ *A23B 2/754* (2025.01); *A23B 4/20* (2013.01); *A23B 70/10* (2025.01); *A23L 13/42* (2016.08); *A23P 20/18* (2016.08); *A23V 2002/00* (2013.01)

(58) Field of Classification Search

CPC A23B 2/754; A23B 70/10; A23B 4/20; A23L 13/42; A23P 20/18; A23V 2002/00

See application file for complete search history.

(56) References Cited

FOREIGN PATENT DOCUMENTS

| | | | |
|---|---|---|---|
| WO | WO-2019/068798 | 4/2019 | |
| WO | WO-2019/091970 | 5/2019 | |
| WO | WO-2019091970 A1 * | 5/2019 | ............... A23B 4/12 |

OTHER PUBLICATIONS

"Sodium Acetate". Available online at https://www.grahamchemical.com/products/sodium-acetate/ on Oct. 24, 2013. (Year: 2013).*

Corbionfood: "About Opti.Form Powder Ace S50," Jan. 1, 2013. http://www.corbion.com/media/166508/optiform-ace-s50-eu-1013-web.pdf.

International Search Report and Written Opinion for PCT/EP2020/087997 mailed Mar. 17, 2021.

Tangkham et al., "Effect of sodium lactate and sodium acetate on shelf-life of raw chicken breasts," African Journal of Food Science, vol. 6(13) pp. 375-380, Jul. 15, 2012.

Taniguchi et al., "Production of a Mixture of Antimicrobial Organic Acids from Lactose by Co-Culture of Bifidobacterium longum and Propionibacterium freudenreichii," Biosci. Biotechnol. Biochem, 62 (8), 1522-1527, 1998.

* cited by examiner

*Primary Examiner* — Erik Kashnikow
*Assistant Examiner* — Assaf Zilbering
(74) *Attorney, Agent, or Firm* — Sunit Talapatra; Foley & Lardner LLP

(57) ABSTRACT

The present invention provides a particulate product comprising lactate-coated particles, wherein the product contains at least 10 wt. % of lactate-coated particles having the following characteristics:

- comprising one or more carrier particles containing at least 80 wt. % of one or more $C_{1-2}$ alkane carboxylates, said one or more $C_{1-2}$ alkane carboxylates being selected from anhydrous and hydrated metal salts of $C_{1-2}$ alkane carboxylic acid, the metal of said metal salts being a cation of a metal selected from sodium, potassium, calcium and combinations thereof;
- comprising a coating layer that covers the one or more carrier particles, said coating layer containing at least 80 wt. % of sodium lactate;
- containing the one or more $C_{1-2}$ alkane carboxylates and sodium lactate in a weight ratio of 1:2 to 2:1; and
- having a particle size in the range of 40 to 1,500 μm.

The particulate product comprising lactate coated particles in the form of $C_{1-2}$ alkane carboxylate particles coated with sodium lactate offers several advantages over dry blends of these organic acid salts.

The invention also relates to the use of the particulate product of the present invention in foodstuffs or beverages.

10 Claims, No Drawings

POWDER COMPRISING LACTATE-COATED PARTICLES AND METHOD FOR THE PREPARATION THEREOF

CROSS-REFERENCE TO RELATED APPLICATIONS

The present application is a continuation application of PCT/EP2020/087997 filed Dec. 29, 2020, which claims priority to EP 20150170.7 filed Jan. 3, 2020 the entire contents of both which are incorporated herein by reference.

TECHNICAL FIELD OF THE INVENTION

The invention relates to a powder comprising particles that contain $C_{1-2}$ alkane carboxylate (acetate or propionate) and sodium lactate. More particularly, these particles comprise one or more carrier particles essentially consisting of $C_{1-2}$ alkane carboxylate and a coating layer that covers these carrier particles, said coating layer essentially consisting of sodium lactate.

The powder containing lactate-coated particles of the present invention may suitably be used as a preservative in food products, notably in processed meat products.

The invention also relates to blends of the lactate-coated particles and other particulate ingredients. In addition, the invention relates to the use of the lactate-coated particles and of blends containing these particles in the preparation of foodstuffs or beverages. Finally, the invention provides a process for the manufacture of the lactate-coated powder.

BACKGROUND OF THE INVENTION

Sodium acetate, potassium acetate and calcium acetate are used as food additives, e.g. as preservatives. These acetate salts may suitably be produced by neutralizing a vinegar with a suitable base (e.g. NaOH, KOH or $Ca(OH)_2$). Alternatively, acetate salt may be produced chemically.

Sodium propionate, potassium propionate and calcium propionate are also used as preservatives in foodstuff. These propionate salts may be produced by fermenting a suitable substrate with *Propionibacterium* followed by neutralization with a suitable base. Alternatively, propionate salts may be produced chemically.

Sodium lactate is typically produced by fermentation of a sugar source, followed by neutralization of the resulting lactic acid. It acts as a preservative, acidity regulator, and bulking agent. Sodium lactate is highly hygroscopic. It absorbs water very rapidly, and in doing so forms a viscous fluid.

Taniguchi et al. (*Production of a mixture of antimicrobial organic acids from lactose by co-culture of Bifidobacterium longum and Propionibacterium freudenreichii*, Biosci Biotechnol Biochem. 1998 August;62(8):1522-7) describe a study in which the antimicrobial activities of standard solutions of three organic acids (lactic, acetic, and propionic acids) were compared using *Micrococcus luteus, Pseudomonas* sp. and *Staphylococcus aureus* as test microorganisms.

Tangkham et al. (*Effect of sodium lactate and sodium acetate on shelf-life of raw chicken breasts*, Afr. J. Food Sci., Vol. 6(13), pp. 375-380, 15 Jul. 2012) describes experiments that were conducted to evaluate the effects of sodium lactate and sodium acetate on the microbiological population and shelf-life of raw chicken breasts. Raw chicken breasts were randomly subjected to treatments containing 0, 0.87 or 1.74% sodium lactate or 1.74% sodium acetate, 3.48% sodium acetate, or the combination of 1.74% sodium lactate and 1.74% sodium acetate. All treatments contained sodium phosphate, sodium chloride and varied levels of distilled water. Samples were refrigerated (2 to 3° C.) and aerobic plate counts (APC) were conducted every 3 days. The combination of 1.74% sodium lactate and 1.74% sodium acetate was the most effective in reducing bacterial growth from days 3 to 15. Sodium acetate was the most effective in inhibiting microbial growth.

Opti.Form® Powder Ace S50 is a commercial product that is marketed by Corbion Purac as a microbial growth inhibitor. The product is a powder blend of sodium lactate and sodium acetate. The composition of the product is 49.5% sodium lactate, 49.5% sodium acetate and 0.5-1.0% water. The product is highly hygroscopic due to the presence of sodium lactate. Also, the sodium lactate particles are quite large due to the fact that they are produced by means of extrusion.

WO 2019/091970 describes a particulate product comprising at least 10 wt. % of coated acetate particles having the following characteristics:

- comprising one or more carrier particles containing at least 80 wt. % of sodium acetate component selected from sodium acetate hydrates, sodium acetate anhydrous and combinations thereof;
- comprising a coating layer that covers the one or more carrier particles, said coating layer containing at least 60 wt. % of potassium acetate;
- containing potassium and sodium in a molar ratio of 0.4:1to 5:1; and
- a particle size in the range of 40 to 1,000 μm.

WO 2019/068798 describes a particulate product comprising at least 10 wt. % of coated lactate particles having the following characteristics:

- comprising one or more carrier particles containing at least 80 wt. % of calcium lactate component selected from calcium lactate hydrates, calcium lactate anhydrous and combinations thereof;
- comprising a coating layer that covers the one or more carrier particles, said coating layer containing at least 60 wt. % of sodium lactate;
- containing sodium and calcium in a molar ratio of 2.1:1 to 5:1; and
- a particle size in the range of 120 to 1,200 μm.

SUMMARY OF THE INVENTION

The inventors have found a way to combine $C_{1-2}$ alkane carboxylate and sodium lactate in a powder form that offers important advantages over dry blends of these organic acid salts. More particularly, the inventors have found that by coating $C_{1-2}$ alkane carboxylate particles with a layer of sodium lactate, a lactate-coated powder can be produced that has better handling characteristics (flowing behaviour and dusting), a better stability, a better homogeneity and less tendency to demix than a dry blend of $C_{1-2}$ alkane carboxylate and sodium lactate. Furthermore, the inventors have found that it is possible to produce these lactate-coated particles in small particles sizes.

Accordingly, the present invention provides a particulate product comprising at least 10 wt. % of lactate-coated particles having the following characteristics:

- comprising one or more carrier particles containing at least 80 wt. % of one or more $C_{1-2}$ alkane carboxylates, said one or more $C_{1-2}$ alkane carboxylates being selected from anhydrous and hydrated metal salts of $C_{1-2}$ alkane carboxylic acid, the metal of said metal salts being a cation of a metal selected from sodium, potassium, calcium and combinations thereof;

comprising a coating layer that covers the one or more carrier particles, said coating layer containing at least 80 wt. % of sodium lactate;

containing the one or more $C_{1-2}$ alkane carboxylates and sodium lactate in a weight ratio of 1:2 to 2:1; and having a particle size in the range of 40 to 1,500 μm.

Another aspect of the invention relates to a method of preparing a foodstuff or a beverage, said method comprising incorporating the aforementioned particulate product in a concentration of 0.1 to 10% by weight of the foodstuff or beverage.

Yet another aspect of the invention relates to a process of producing the particulate product of the present invention, said process comprising:

providing a fluidized bed of carrier particles containing at least 80 wt. % of one or more $C_{1-2}$ alkane carboxylates, said one or more $C_{1-2}$ alkane carboxylates being selected from anhydrous and hydrated metal salts of $C_{1-2}$ alkane carboxylic acid, the metal of said metal salts being a cation of a metal selected from sodium, potassium, calcium and combinations thereof;

spray coating the carrier particles by spraying the fluidized bed with an aqueous liquid containing 32-75 wt. % sodium lactate; and drying the spray lactate-coated carrier particles.

DETAILED DESCRIPTION OF THE INVENTION

A first aspect of the invention relates to a particulate product comprising lactate-coated particles, wherein the product contains at least 10 wt. % of lactate-coated particles having the following characteristics:

comprising one or more carrier particles containing at least 80 wt. % of one or more $C_{1-2}$ alkane carboxylates, said one or more $C_{1-2}$ alkane carboxylates being selected from anhydrous and hydrated metal salts of $C_{1-2}$ alkane carboxylic acid, the metal of said metal salts being a cation of a metal selected from sodium, potassium, calcium and combinations thereof;

comprising a coating layer that covers the one or more carrier particles, said coating layer containing at least 80 wt. % of sodium lactate;

containing the one or more $C_{1-2}$ alkane carboxylates and sodium lactate in a weight ratio of 1:2 to 2:1; and having a particle size in the range of 40 to 1,500 μm as measured using laser diffraction.

The term 'particulate product' as used herein refers to a product that is composed of particles, such as a powder or a granulate.

The term '$C_{1-2}$ alkane carboxylates' as used herein refers to acetates, propionates and combinations thereof.

The term 'sodium lactate' as used herein refers to sodium lactate anhydrous ($CH_3CH(OH)COONa$).

Whenever reference is made herein to 'lactate-coated particles', unless indicated otherwise, what is meant are the lactate-coated particles having the characteristics as specified above or of preferred embodiments of these lactate-coated particles as specified herein.

Whenever reference is made herein to the particle size of a particle, unless indicated otherwise, this particle size is the particle size measured using laser diffraction (Malvern Mastersizer 3000).

The lactate-coated particles of the present invention preferably have a water content of less than 3.5 wt. %, more preferably of less than 3.0 wt. % and most preferably of less than 2.5 wt. %. Whenever reference is made herein to the water content of a material, this is the water content as typically measured by means of the Karl Fischer titration method, including crystal water that is contained in hydrates, such as sodium acetate trihydrate ($C_2H_9NaO_5$).

The water content of the particulate product of the present invention typically is less than 3 wt. %, preferably less than 2 wt. % and more preferably less than 1.5 wt. %, and most preferably less than 1.0 wt. %. Here the water content of the particulate product includes the water that is contained in the lactate-coated particles.

In a preferred embodiment, the particulate product contains at least 20 wt. %, more preferably at least 50 wt. %, even more preferably at least 80 wt. % and most preferably at least 90 wt. % of the lactate-coated particles.

Besides the lactate-coated particles, the particulate product may suitably contain one or more other particulate ingredients.

According to another preferred embodiment, the lactate-coated particles have an average diameter D[4,3] in the range of 100 to 900 μm, more preferably in the range of 200 to 800 μm and most preferably in the range of 300 to 700 μm. Here the 'average diameter D[4,3]' refers to the De Brouckere mean diameter or volume mean diameter and can be defined as the weighted average volume, assuming spherical particles of the same volume as the actual particles. This average diameter is calculated by means of the following equation:

$$D[4,3] = \frac{\sum (n_i D_i^4)}{\sum (n_i D_i^3)}$$

wherein:

Di=mean particle size in size class i;

$n_i$=number of particles in size class i

In a further preferred embodiment, at least 80 wt. % of the lactate-coated particles have a particle size in the range of 100 to 1200 μm, more preferably in the range of in the range of 200 to 1,000 μm, most preferably in the range of in the range of 250 to 900 μm.

The particulate product of the present invention preferably has a bulk density in the range of 0.45-0.75 g/ml, more preferably in the range of 0.5-0.70 g/ml and most preferably in the range of 0.52-0.65 g/ml. The term 'bulk density' as used herein refers to the mass of a quantity of the particulate product divided by the total volume that is occupied by said quantity. The total volume includes particle volume, inter-particle void volume, and internal pore volume. The bulk density referred to herein is the "tapped" density, i.e. the bulk density of the product after being mechanically tapped until there are no further changes in volume (nominal count of minimum 180 taps).

The one or more carrier particles within the lactate-coated particles preferably contain at least 85 wt. %, more preferably at least 90 wt. % and most preferably at least 92 wt. % of the one or more $C_{1-2}$ alkane carboxylates.

The one or more $C_{1-2}$ alkane carboxylates in the carrier particles preferably largely consists of anhydrous $C_{1-2}$ alkane carboxylates. Accordingly, in a preferred embodiment, the one or more carrier particles contain at least 80 wt. %, more preferably at least 85 wt. % and most preferably contain at least 90 wt. % of one or more anhydrous $C_{1-2}$ alkane carboxylates.

In an advantageous embodiment of the present invention the one or more $C_{1-2}$ alkane carboxylates are selected from sodium acetate hydrates, sodium acetate anhydrous and combinations thereof. Most preferably, the one or more $C_{1-2}$ alkane carboxylates are sodium acetate anhydrous.

According to another advantageous embodiment, the one or more $C_{1-2}$ alkane carboxylates are selected from calcium propionate hydrates, calcium propionate anhydrous and combinations thereof. Most preferably, the one or more $C_{1-2}$ alkane carboxylates are calcium propionate anhydrous.

In one preferred embodiment of the invention, the total amount of sodium in the lactate-coated particles is preferably in the range of 20-25 wt. %, more preferably in the range of 22-24 wt. %.

In another preferred embodiment of the invention, the lactate-coated particles contain 2-15 wt. % sodium and 6-19 wt. % calcium, more preferably 3-12 wt. % sodium and 8-15 wt. % calcium.

The coating layer of the coated lactate particles preferably contains at least 85 wt. %, more preferably at least 90 wt. % and most preferably at least 92 wt. % of sodium lactate.

The lactate-coated particles of the present invention may contain one or more additional coating layers besides the coating layer containing the sodium lactate. The benefits of the present invention, however, are particularly appreciated in case the lactate-coated particles contain no additional coating layers.

In another preferred embodiment, the one ore more $C_{1-2}$ alkane carboxylates and sodium lactate are present in the lactate-coated particles in a weight ratio of 2:3 to 3:2, most preferably in a weight ratio of 3:4 to 4:3.

According to a preferred embodiment, the combination of $C_{1-2}$ alkane carboxylate and sodium lactate constitutes at least 80 wt. %, more preferably at least 90 wt. % and most preferably at least 95 wt. % of the lactate-coated particles.

The one or more carrier particles that are contained in the lactate-coated particles of the present invention preferably have a median particle size in the range of 20-1000 μm, more preferably in the range of 100-800 μm, most preferably in the range of 150-750 μm.

Another aspect of the invention relates to a method of preparing a foodstuff or a beverage, said method comprising incorporating a particulate product as defined herein, in a concentration of 0.1 to 10% by weight, preferably 0.3 to 5% by weight, more preferably 0.5-3% by weight of the foodstuff or the beverage.

Preferably, the particulate product is incorporated in the foodstuff or the beverage in a concentration that provides 0.2-1.5%, more preferably 0.4-1.2% of the lactate-coated particles by weight of the foodstuff or the beverage.

The present method preferably comprises the step of distributing the particulate product throughout the foodstuff or of dispersing the particulate product throughout the beverage.

Preferably, the present method comprises incorporating the particulate product in a foodstuff.

According to a particularly preferred embodiment the foodstuff is a meat product, more preferably a processed meat product. Examples of processed meat products include:

- fresh processed meat products (e.g. hamburgers, fried sausage, kebab, chicken nuggets)
- cured meat pieces (e.g. raw cured beef, raw ham, cooked beef, cooked ham, reconstituted products and bacon)
- raw-cooked products (e.g. Frankfurter, mortadella, Lyoner and meat loaf)
- precooked-cooked products (e.g. liver sausage, blood sausage and corned beef)
- raw (dry)-fermented sausages (e.g. salami)
- dried meat Most preferably, the present method is applied in the preparation of a processed meat product selected from cured meat pieces and raw (dry)-fermented sausages.

Yet another aspect of the invention relates to a process of producing the particulate product of the present invention, said process comprising:

- providing a fluidized bed of carrier particles containing at least 80 wt. % of one or more $C_{1-2}$ alkane carboxylates, said one or more $C_{1-2}$ alkane carboxylates being selected from anhydrous and hydrated metal salts of $C_{1-2}$ alkane carboxylic acid, the metal of said metal salts being a cation of a metal selected from sodium, potassium, calcium and combinations thereofof;
- spray coating the carrier particles by spraying the fluidized bed with an aqueous liquid containing 32-75 wt. % sodium lactate; and
- drying the lactate-coated carrier particles.

In a preferred embodiment of the production process, the carrier particles contain at least 85 wt. %, more preferably at least 90 wt. % and most preferably at least 92 wt. % of the $C_{1-2}$ alkane carboxylate.

In one embodiment, the one or more carrier particles preferably contain at least 80 wt. %, more preferably at least 85 wt. % and most preferably at least 90 wt. % of anhydrous sodium acetate.

In another embodiment, the one or more carrier particles preferably contain at least 80 wt. %, more preferably at least 85 wt. % and most preferably at least 90 wt. % of anhydrous calcium propionate.

In a particularly preferred embodiment of the invention at least 80 wt. %, more preferably at least 90 wt. % of the carrier particles have a particle size in the range of 20-1000 μm, more preferably in the range of 100-800 μm, most preferably in the range of 150-750 μm.

The aqueous liquid that is employed in the aqueous process preferably contains 35-73 wt. %, more preferably 45-70 wt. % of sodium lactate.

Drying of the spray coated particles is preferably achieved simultaneously with the spray coating by passing a stream of drying gas through the fluidized bed of particles. The drying gas employed is preferably selected from air, oxygen, nitrogen and combinations thereof.

Simultaneous spray coating and drying is preferably carried out using an drying gas temperature in the range of 70-160° C., more preferably in the range of 75-140° C. and most preferably in the range of 80-120° C.

Simultaneous spray coating and drying is preferably carried out by spraying the aqueous liquid at a pressure of 1.5-4 bar, most preferably at a pressure of 2-3.5 bar.

The invention is further illustrated by means of the following non-limiting examples.

EXAMPLES

Example 1

Lactate-coated particles according to the present invention were prepared in a GLATT® fluid bed dryer as described below.

Sodium acetate powder (Sodium acetate anhydrous, ex Flevochemie, the Netherlands) having an average diameter D[4,3] of 450 μm was used as a starting material.

The basket of the fluid bed dryer was filled with the sodium acetate powder and heated up to 70° C. during fluidization of the product.

A 60% aqueous solution of sodium lactate was used as spraying liquid. This solution is kept at 70° C.

Spraying is started when the fluidized bed has reached a temperature of 70° C. Inlet aft temperature was kept between 80 and 100° C. and spray pressure at 3 bar. At the beginning spray rate was kept low and was slowly increased until approximately 15 wt. % of the sodium lactate had been sprayed. Then the spray rate was increased to the maximum. (17 g/kg of moisture in the exhaust air, maximum water carrying capacity achieved in exhaust air). When all sodium lactate solution was sprayed, and a composition of 50 wt. % sodium acetate and 50 wt. % sodium lactate was reached, the material was dried to a moisture content below 1 wt. %, cooled and discharged.

The lactate-coated powder so produced had an average diameter D[4,3] of approximately 620 μm.

Example 2

The acete-lactate powder of Example 1 was compared with a 1:1 (w/w) dry blend of sodium acetate and sodium lactate (Sodium L-Lactate Powder, ex Corbion, the Netherlands, water content less than 1 wt. %). Each of these two powders was blended with 1 wt. % of silica to improve flowability.

Table 1 presents the particle size distribution of the acetate-lactate powder and the dry blend, as determined by laser diffraction. D(x) represents the particle size that x % w/w of the particles in the powder is smaller than.

TABLE 1

| | acetate-lactate powder | dry blend |
|---|---|---|
| D[4,3] | 622 μm | 939 μm |
| D(10) | 336 μm | 366 μm |
| D(50) | 581 μm | 789 μm |
| D(90) | 973 μm | 1763 μm |
| Span | 1.1 | 1.8 |

The acetate-lactate powder did not only have a mean particle size that is significantly lower than that of the dry blend, but it also has a span (D(90)-D(10))/D50 that is almost a factor 2 smaller than that of the dry blend.

The particle size distribution of the acetate-lactate powder is more favourable with respect to homogeneity and tendency for demixing. Also the fact that the acetate-lactate powder consists of one type of particles whereas the blend is composed of two different types of particles renders the acetate-lactate powder more attractive from the perspective of homogeneity and tendency for demixing.

Example 3

Calcium propionate particles coated with sodium lactate were prepared in Glatt fluid bed granulator.

Calcium propionate powder having an average diameter D[4,3] of 450 μm was used as starting material. A 60% aqueous solution of sodium lactate was used as spraying liquid. This solution was kept at 70° C. Calcium propionate was charged to fluidized bed and heated by fluidization air to 95° C. It was kept on this temperature for 5 minutes to dry the traces of moisture that might be present. Spraying was started and product temperature was kept at 70-80° C. Inlet air temperature was kept between 80 and 90° C. Atomization air pressure was 3 bar. Spray rate during the trial was very low in the range of 5-8 g/min.

When the calcium propionate powder had been loaded with 30 wt. % of sodium lactate, the coated powder material was dried, cooled and discharged from the granulator. The coated powder so produced has an average diameter D[4,3] of approximately 500 μm.

The invention claimed is:

1. A particulate product, comprising at least 10 wt. % of lactate-coated particles comprising:
(a) one or more carrier particles comprising at least 80 wt. % of one or more C1-2 alkane carboxylates selected from anhydrous and hydrated metal salts of C1-2 alkane carboxylic acid, the metal of the metal salts being a cation of a metal selected from sodium, potassium, calcium and combinations thereof;
(b) a coating layer that covers the one or more carrier particles, the coating layer comprising at least 80 wt. % of sodium lactate; and
(c) the one or more C1-2 alkane carboxylates and sodium lactate in a weight ratio of 1:2 to 2:1,
wherein the particles have a size in the range of 40 to 1,500 μm as measured using laser diffraction.

2. The particulate product according to claim 1, wherein the one or more carrier particles comprise at least 90 wt. % of the one or more C1-2 alkane carboxylates.

3. The particulate product according to claim 1, wherein the coating layer comprises at least 90 wt. % of sodium lactate.

4. The particulate product according to claim 1, wherein the one or more C1-2 alkane carboxylates and sodium lactate are present in the lactate-coated particles in a weight ratio of 2:3 to 3:2.

5. The particulate product according to claim 1, wherein the combination of C1-2 alkane carboxylate and sodium lactate comprises at least 80 wt. % of the lactate-coated particles.

6. The particulate product according to claim 5, wherein the combination of C1-2 alkane carboxylate and sodium lactate comprises at least 90 wt. % of the lactate-coated particles.

7. The particulate product according to claim 1, wherein the one or more C1-2 alkane carboxylates are selected from sodium acetate hydrates, sodium acetate anhydrous and combinations thereof.

8. The particulate product according to claim 1, wherein the one or more C1-2 alkane carboxylates are selected from calcium propionate hydrates, calcium propionate anhydrous and combinations thereof.

9. The particulate product according to claim 1, wherein the lactate-coated particles have an average diameter D[4,3] in the range of 100 to 900 μm.

10. The particulate product according to claim 1, wherein the product has a bulk density in the range of 0.45-0.75 g/ml.

* * * * *